United States Patent [19]
Colaner

[11] Patent Number: 5,277,104
[45] Date of Patent: Jan. 11, 1994

[54] PRETZEL OVEN WITH ELECTRONIC HEAT CONTROL

[75] Inventor: Cynthia C. Colaner, Portage County, Ohio

[73] Assignee: Hot Sam Companies, Inc., Cleveland, Ohio

[21] Appl. No.: 44,839

[22] Filed: Apr. 8, 1993

[51] Int. Cl.$^5$ .............................. A21B 5/06
[52] U.S. Cl. ...................... 99/331; 99/337; 99/352; 99/433 C; 219/388
[58] Field of Search ..................... 99/325, 327; 331–333, 334, 337, 338, 345, 352, 348, 349, 385, 386, 389, 391, 392, 443 R, 443 C, 447, 373; 219/388; 198/952; 426/19, 499

[56] References Cited

U.S. PATENT DOCUMENTS

| | | |
|---|---|---|
| D. 194,085 | 11/1962 | Reach . |
| D. 194,086 | 11/1962 | Reach . |
| D. 205,874 | 9/1966 | King . |
| 2,119,910 | 6/1938 | Ferry . |
| 2,472,650 | 6/1949 | Curlee . |
| 2,932,263 | 4/1960 | Leuthauser . |
| 3,026,824 | 3/1962 | Reach . |
| 3,110,391 | 11/1963 | Warren . |
| 3,164,490 | 1/1965 | Evanson et al. . |
| 3,244,352 | 4/1966 | Reach . |
| 3,245,581 | 4/1966 | Reach . |
| 3,329,080 | 7/1967 | Reach . |
| 3,340,824 | 9/1967 | Talbot . |
| 3,347,153 | 10/1967 | Sutton . |
| 3,394,665 | 7/1968 | Williams . |
| 3,640,207 | 2/1972 | Snyder . |
| 3,876,815 | 4/1975 | Kurzius . |
| 3,935,807 | 2/1976 | Main et al. . |
| 4,243,441 | 1/1981 | Wilson ............................ 219/388 |
| 4,262,586 | 4/1981 | Miller et al. ................... 99/443 C |
| 4,386,558 | 6/1983 | Holman et al. ................. 99/386 |
| 4,473,004 | 9/1984 | Wells et al. .................... 99/386 |
| 4,517,447 | 5/1985 | Hicks ............................. 219/388 |
| 4,544,437 | 11/1985 | Wagner et al. ................ 219/388 |
| 4,548,130 | 10/1985 | Diener et al. ................. 99/443 C |

OTHER PUBLICATIONS

Watlow Microprocessor-Based Auto-Tuning Control User's Manual Oct. 1990.
Pacific Bearing Vespel Sp-21 Bearings Guide.
Dayton Maxi-Tag Gearmotor Operating Instructions.

*Primary Examiner*—Timothy F. Simone
*Attorney, Agent, or Firm*—Fay, Sharpe, Beall, Fagan, Mijnich & McKee

[57] ABSTRACT

A pretzel oven with electronic heat control bakes a plurality of pretzel-like bakery products in a continuous baking process. The pretzel oven includes a microprocessor-based control, a solid state relay for reduced maintenance and improved bakery production, an over-heat temperature electrical source in the event of fire or other over temperature conditions. A caustic soda heater and thermostat regulate the temperature of a soda bath. A universal joint isolates the main drive motor from side loads and permits a tilting or angling thereof for enhanced lubricating properties. The salt box for salting the bakery products is separately controllable.

34 Claims, 4 Drawing Sheets

PRETZEL OVEN WITH ELECTRONIC HEAT CONTROL

BACKGROUND OF THE INVENTION

This application pertains to the art of baking apparatus and more particularly to portable apparatus for baking pretzel-like bakery products in a continuous process. The invention is specifically applicable to baking pretzels in an oven having a chamber containing a number of processing stations wherein the bakery products are transported to the plurality of stations via a positively driven endless drive chain and will be described with particular reference thereto. Currently, popular automatic baking apparatus include a plurality of baking racks connected to drive chains for processing soft pretzels by first spraying the pretzels with a soda solution, salting the pretzels and then baking and browning the salted pretzels through use of radiant heat rods before the products are removed from the baking racks. It will be appreciated, though, that the present invention has broader applications such as conveyor belt baking operations wherein a plurality of baking stations are linearally traversed by means of a conveyor or the like in a oven-like chamber containing a number of sequentially arranged processing stations.

A fairly popular automatic baking apparatus is described in U.S. Pat. No. 3,935,807. That apparatus is illustrated in FIG. 1. According to that teaching, a housing is provided which includes an oven-like chamber therein, the chamber having a pair of power-driven belts which comprise a pair of endless drive chains 14 and 16. Baking racks 12 are pivotally connected to the pair of endless drive chains 14 and 16 in a manner to permit them to freely swing or pivot throughout the processing of the pretzels. The endless drive chains 14 and 16 are driven by a combination of a motor 18 and gearing in a gearbox 40 moving the baking racks at a controlled rate through a series of processing stations. The pair of endless drive chains 14 and 16 are supported on the housing through a plurality of free turning gears 36, 37, 38 and 39 which are mounted on rods supported by a portion of a frame 30 adjacent a side panel 32. These free turning gears include Teflon bearings to minimize gear drag.

Well known shortcomings of the above arrangements include premature failure of the Teflon drive chain bearings due to excessive heat buildup and premature wear on the bearings in the motor 18 due to side-loading on the motor output shaft.

With continued reference to the prior art pretzel oven of FIG. 1, the upper portion thereof includes a salter 22 which includes a closed cylinder 22a with a single longitudinal row of openings 72 located therein, allowing the salt contained within the cylinder 22a to fall out during rotation onto pretzels. Similar to the free turning gears 36, 37, 38 and 39 mentioned above, the rotating salt box of the prior art was supported by two Teflon saddles, which tended to soften at cooking temperatures, therefore deteriorated rapidly and failed in use.

Also, in the upper portion of the oven itself, a plurality of heating elements comprising five longitudinal Cal rods 24 provided sufficient quantity of heat to bake the frozen pretzel products as they progress through the oven supported on the baking racks. In addition to the Cal rods, five transverse infra-red quartz rods 28, in combination with individual reflectors 29, were provided to bake the upper portion of the pretzels and aid in imparting to the upper surface of the pretzels a unique light brown color that adds considerably to the appeal of the pretzels. Unfortunately, the arrangement of Cal rods and quartz rods provided inadequate control over the baking process itself to the extent that the exact cooking temperature of the oven could not be determined or readily controlled during operation. In practice, only a "setting" temperature was available to the operator. Thus, the set point temperature was unreliable and prevented diagnosis of pretzel quality problems. For example, a determination of whether light pretzels were due to failures in heating elements or whether they were due to defects in the pretzels themselves was not determinable. Some of the above problems in the baking process, though primarily attributable to the Cal rods and quartz rods, were also in part due to inadequate or improper insulation of the housing forming the pretzel oven.

In order to control the prior art oven, a mechanical thermostat was typically connected between a source of power and the Cal and quartz rods. This thermostat was usually of the bi-metallic type and thus imparted a substantial desensitizing effect to the temperature control which was due to slow response time, resulting in undercooked pretzels when the oven was fully loaded and dark blistered pretzels on the last rack in a series of a full load.

Maintenance costs of the prior art pretzel oven apparatus were quite high since the quartz rods, used as critical heating elements, were difficult to maintain. In use, the quartz rods have a life expectancy on the order of 2000 hours. Further, the wire leads feeding to the quartz rods were oftentimes unable to withstand the high temperatures which were periodically generated at the top portion of the oven. Both hardware and labor costs detracted from the profitability of operating such a pretzel oven apparatus according to the prior art.

With continued reference to FIG. 1, a common problem experienced in automatic pretzel ovens in the past has been a weakening of the one molar sodium hydroxide solution used for glazing through the spray tube 20 of the spray section at the bottom of the oven as salt from the salter 22 eventually migrated through the oven and into the catch tray 62. More particularly, salt not adhering to the pretzels themselves found no other place to go but into the catch tray 62 to mixedly combine with the sodium hydroxide solution weakening its effectiveness.

More serious shortcomings of the prior art pretzel oven includes a failure to detect fires within the oven itself. Should an oven of this type be left unattended for prolonged periods, a fire could start in the upper portion of the oven and continue undetected endangering both personnel and equipment.

It has, therefore, been deemed desirable to provide a safe, economical and improved continuous process pretzel oven.

SUMMARY OF THE INVENTION

The present invention contemplates a new and improved pretzel oven which overcomes the above-referenced problems and provides operators with the ability to more readily control the baking process to increase the oven throughput resulting in increased profits for pretzel vendors.

According to the present invention, a pretzel oven is provided with an electronic heat control mechanism to bake the products evenly without burning them.

According to a more limited aspect of the invention, the pretzel oven includes improved bushings supporting the rotation of the sprockets used to support the pair of endless drive chains. Similarly, improved material is used in the salt box supports to prolong the lifespan thereof under extreme conditions.

According to another aspect of the invention, a microprocessor-based digital control apparatus is used to regulate the baking elements for precise control over the temperature in the oven.

According to yet another aspect of the invention, a universal joint is incorporated into the drive system between the driving motor and the pair of endless drive chains in order to absorb transversal loads on the motor shaft. The drive motor itself is inclined or "tilted" with respect to horizontal for improved lubrications of internal gearing.

According to yet a further aspect of the invention, a solid state relay is used in place of a mechanical relay to control the connection between the heating elements and the source of power. A pair of thermocouples are connected to the microprocessor-based temperature controller to sense the temperature at two locations within the oven housing.

According to still yet a further aspect of the invention, a flat salt tray is provided to catch excess salt preventing it from dissolving into the sodium hydroxide solution used for coating the pretzel products.

According to still yet a further aspect of the present invention, a high-limit device is provided near the top of the oven to sense fires or other high temperature conditions. The electrical components are disconnected at a main line contactor in the event of an over temperature condition.

A primary advantage of the invention resides in the ability to quickly, accurately and uniformly bake a large quantity of pretzels without undercooking the product or burning the product.

Another advantage of the invention is found in the reduced maintenance necessary to support ovens installed and operating at a plurality of locations by reducing the number of components prone to failure.

Still another advantage of the invention is realized in cost savings to both the pretzel consumers and the operators due to more efficient utilization of energy.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENTS

Figure 1:
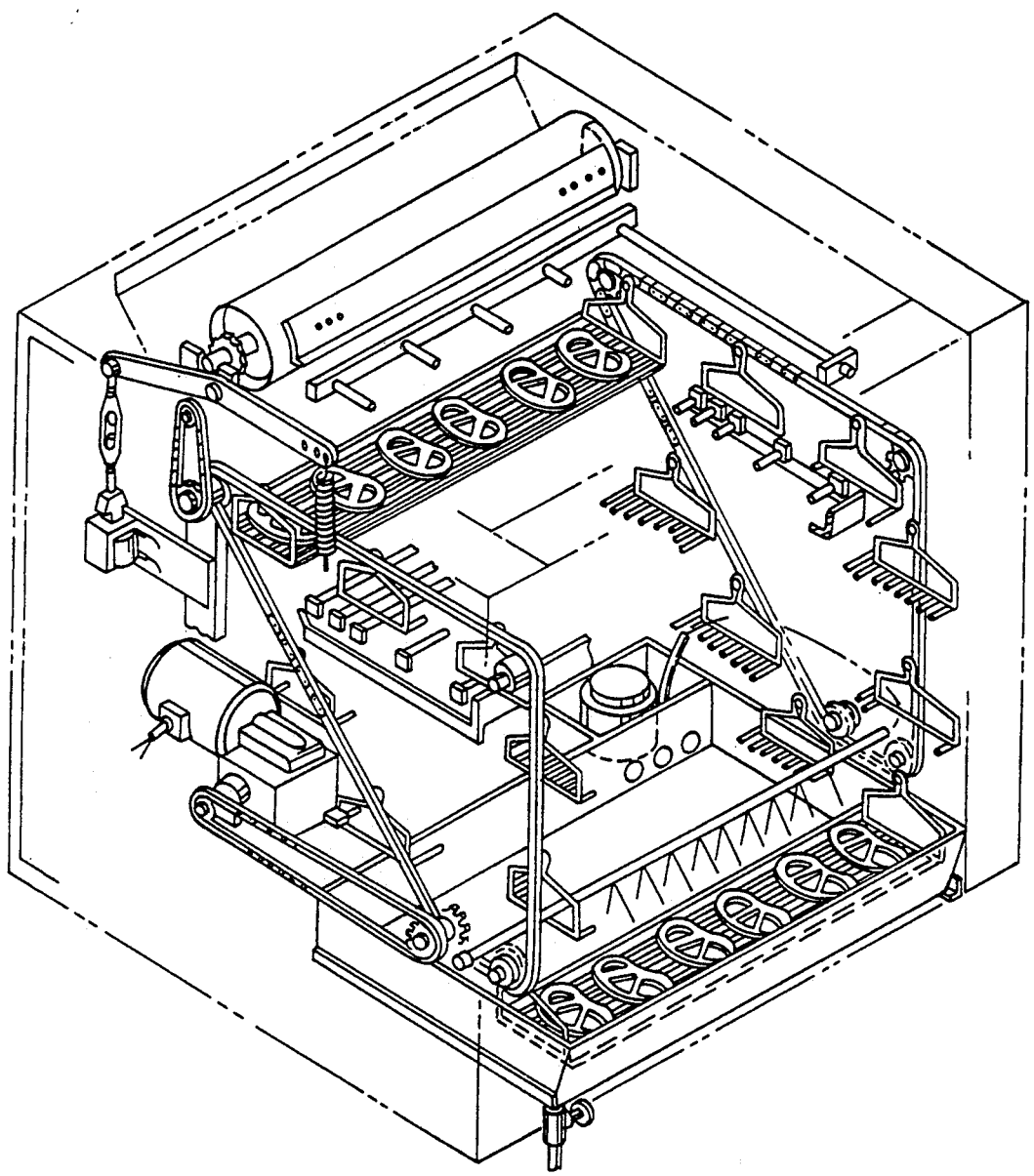
FIG. 1 is an isomeric view of a pretzel baking apparatus according to the teachings of the prior art.

Referring now to the drawings, wherein showings are for purposes of illustrating the preferred embodiment of the invention only and not for the purposes of limiting same, the figures show an oven for baking a pretzel-like bakery product including a housing, an endless drive belt mounted to the housing, a plurality of carrier racks attached to the drive belt, a drive motor for moving the drive belt through a closed path, a plurality of baking elements in the chamber for baking a bakery product and an electronic control apparatus regulating the baking elements according to a predetermined temperature set point.

Figure 2:
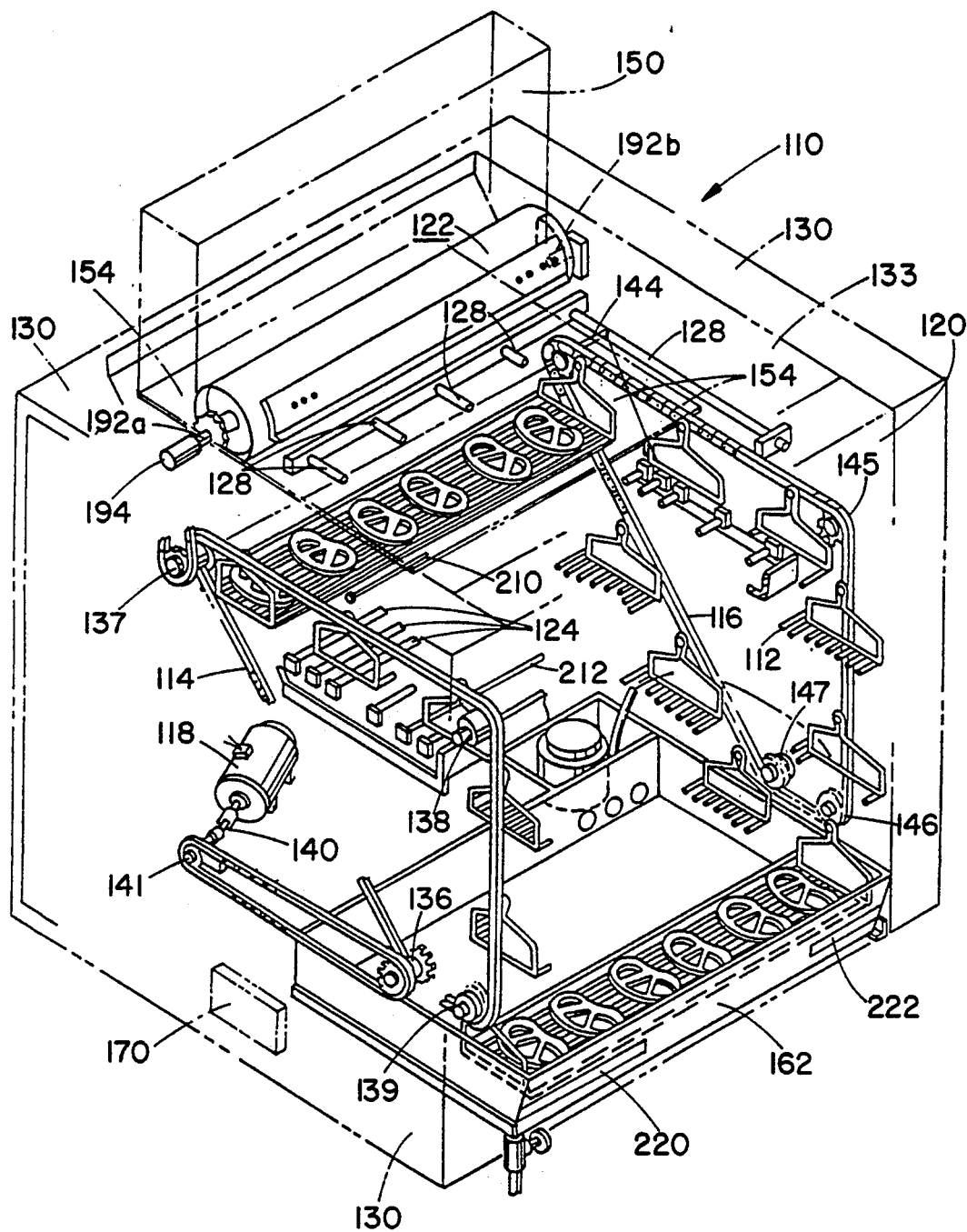
FIG. 2 is an isomeric view of the pretzel oven of the subject invention.
Figure 4A:
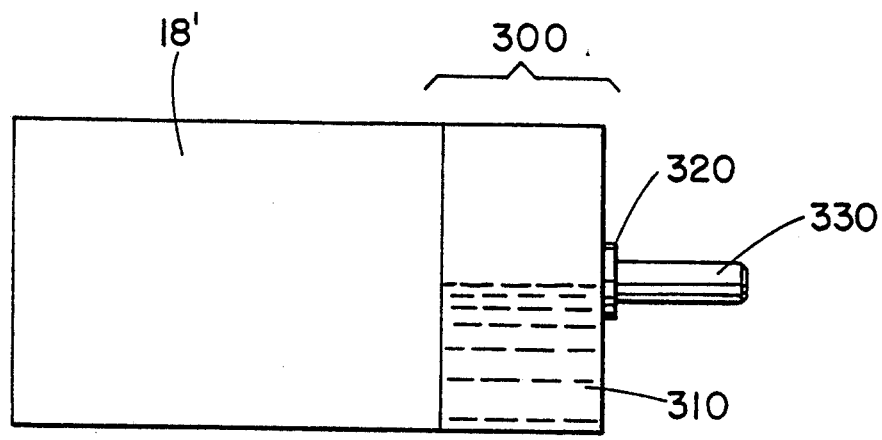

More particularly with reference to FIG. 2, the pretzel oven 110 includes a plurality of baking racks 112 attached to a pair of endless drive chains 114 and 116. The endless drive chains 114 and 116 are continuously driven at a controlled rate by a combination of a motor 118 and a sprocket 141. The motor 118 includes an internal gearcase (not shown) for matching the motor shaft speed and torque to that of the desired drive chain speed and torque. A universal joint 140 is advantageously provided between the sprocket 141 and the electric motor 118 to absorb transversal loads on the output shaft of the motor due to side-loading. Also, the motor 118 is tilted to reduce the radial load on the output shaft, to permit the universal joint 140 to absorb the axial load more efficiently, to reduce the weight borne by the bearing which supports the output shaft and lastly, to better lubricate the motor output gears and shaft as explained in greater detail below with reference to FIGS. 4a and 4b. As an alternative to the U-joint illustrated in the figure, a constant velocity joint or a flexible shaft may be substituted. In the event of a flexible shaft, the electric motor 118 may be suitably positioned at a convenient access point for maintenance purposes. In any event, failure due to side-loading on the output shaft of the motor is completely eliminated by the universal joint 140 of the preferred embodiment.

With continued reference to that figure, a plurality of sprockets 136-139 and 144-147 are suitably provided connected to the oven housing 130 to support the drive chains 114 and 116. In the preferred embodiment of the instant invention, each of the sprockets 136-139 and 144-147 implement non-flanged aluminum high-temperature bushings preventing seizure of the sprockets on the shafts due to excessive temperatures. In the preferred embodiment, the bearings are made from an SP polyimide resin combining the best characteristics of plastics, metals and ceramics. These bearings are suitable for applications intermittently up to 900° F. The bearings are available from Pacific Bearing Company under the designation FL-8. Other bearings having similar suitable characteristics may also be used. In greater detail, each of the bearings provided on the shaft between the sprockets 136-139 and 144-147 include an inner layer of Frelon and an outer layer of anodized aluminum. Between the Frelon layer and the anodized aluminum outer layer, a bonding agent is used for adhesion purposes. According to the preferred embodiment illustrated in FIG. 2, the problems associated with flanged Teflon bearings used in the prior art are nearly completely obliterated. In the past, the flanged Teflon bearings deteriorated rapidly in high temperatures, in particular, near the top of the oven. The implementation of these new temperature impervious bearings significantly reduces the maintenance required and in turn enhance the productivity of the oven.

A salt box 122 is provided near the upper portion of the oven. The salt box 122 is attached to the housing 130 using supports 192a, 192b. A ceramic, self-lubricating material is machined into each of the supports in order to insure operation at elevated temperatures beyond 600° F. In the prior art oven, the rotating salter was supported by two Teflon saddles, which tended to soften at cooking temperatures and, therefore, deteriorated rapidly. However, in the preferred embodiment of the instant invention, the ceramic, self-lubricating material machined into each of the supports 192a and 192b prevent melting and distortion at temperatures beyond 600° F. Although illustrated in the Figure as having a circular cross section, the salt box 122 may also have a substantially square, rectangular or triangular cross section for improved agitation of the salt contained therein.

In order to effectuate a more efficient baking of the pretzel-like bakery product, the preferred embodiment of the instant invention includes a sight glass 120 which extends from the top of the oven 133 to a point substantially midway between the top 133 and the bottom of the oven. The sight glass is made of a heat-reflective material called Pyroceram II available from Corning. The sight glass has a dual purpose wherein it both allows the product to be displayed as it is cooked and reduces the area of the oven open to the outside. In the prior art system illustrated in FIG. 1, about 4.6 square feet is left open allowing escape of the heat into the ambient air. In the preferred embodiment of the instant invention, the sight glass 120 reduces the open area by 31.8%. This, of course, translates into a more efficient containment of heat within the oven. Also, as an added safety feature, the sight glass is clear in order that an operator of the oven may view the pretzels as they progress through the various baking stations. This provides a safe alternative to an opaque front oven cover.

In addition to enhancing the oven's heat containment capabilities through the sight glass 120, the housing 130 of the oven of the preferred embodiment is made of double stainless steel panels with layers of felted slag insulation permanently sealed therebetween. In addition, a 3 inch thick blanket of insulation is incorporated into the top of the oven where most of the heat loss occurs. In the prior art oven, excessive heat loss occurred through the housing itself. Also, hot surfaces on the exterior of the oven provided unsafe operating conditions for operators who might be burned through inadvertent touching of the housing. According to the preferred embodiment of the instant invention, the layers of felted slag insulation permanently sealed into the body of the oven via the double stainless steel panels provide sufficient and adequate containment of heat reducing the amount escaped through the housing itself. Overall, a more efficient baking process is achieved along with a reduced outer housing temperature.

In the pretzel oven according to the prior art illustrated in FIG. 1, the top was open over the salter to allow hot air to escape. According to the preferred embodiment of the instant invention illustrated in FIG. 2, a felted slag board is used beneath the electrical components and most of the wiring related to the salt box discussed below. This board protects these vulnerable components from heat deterioration and further insulates the oven. In addition, an insulated salt box cover 150 is advantageously provided to cover the entire rotating salt box to better contain the heat generated within the oven.

As described above, a problem associated with the prior art ovens was the weakening of the one molar sodium hydroxide solution used for glazing the pretzels at the bottom using the spray mechanism 20 illustrated in FIG. 1. In the preferred embodiment of the instant invention illustrated in FIG. 2, a flat salt catcher tray 154 is provided to catch the excess salt which does not stick to the pretzel preventing the salt from falling into the sodium hydroxide bath held in the bath container 162. The flat tray extends to cover substantially the majority of the salting zone in order that salt which bounces from the pretzel is caught preventing it from falling into the caustic soda container 162.

An important advance over the prior art systems is the microprocessor-based temperature controller 170 of the preferred embodiment of the instant invention. The microprocessor-based controller is available from Watlow Controls as Series 965. A digital readout of the actual oven temperature is clearly displayed on the Watlow controller for the operator's information. When the heating elements are functioning properly, the operator is able to observe the actual temperature which is sensed within the oven through a plurality of thermocouples described below. The actual temperature approximates the set point temperature with little more than 20° F. variance. Through both heat intensification in all baking zones through the enhancements described above relating to the heat containment effectiveness and the improved microprocessor-based temperature controller. An improved response time of the heating elements is achieved, and the cook cycle is reduced to thirteen minutes in the preferred embodiment over seventeen minutes observed in the prior art systems.

With reference to both FIGS. 1 and 2, a solid state relay 200 is controlled by the microprocessor-based controller 170. The solid state relay of the preferred embodiment is a significant improvement over the mechanical thermostat of the prior art system which exhibited a slow response time. The microprocessor-based temperature controller in conjunction with the solid state relay provides a closer and quicker response of the heating elements to the temperature demand.

Figure 3:
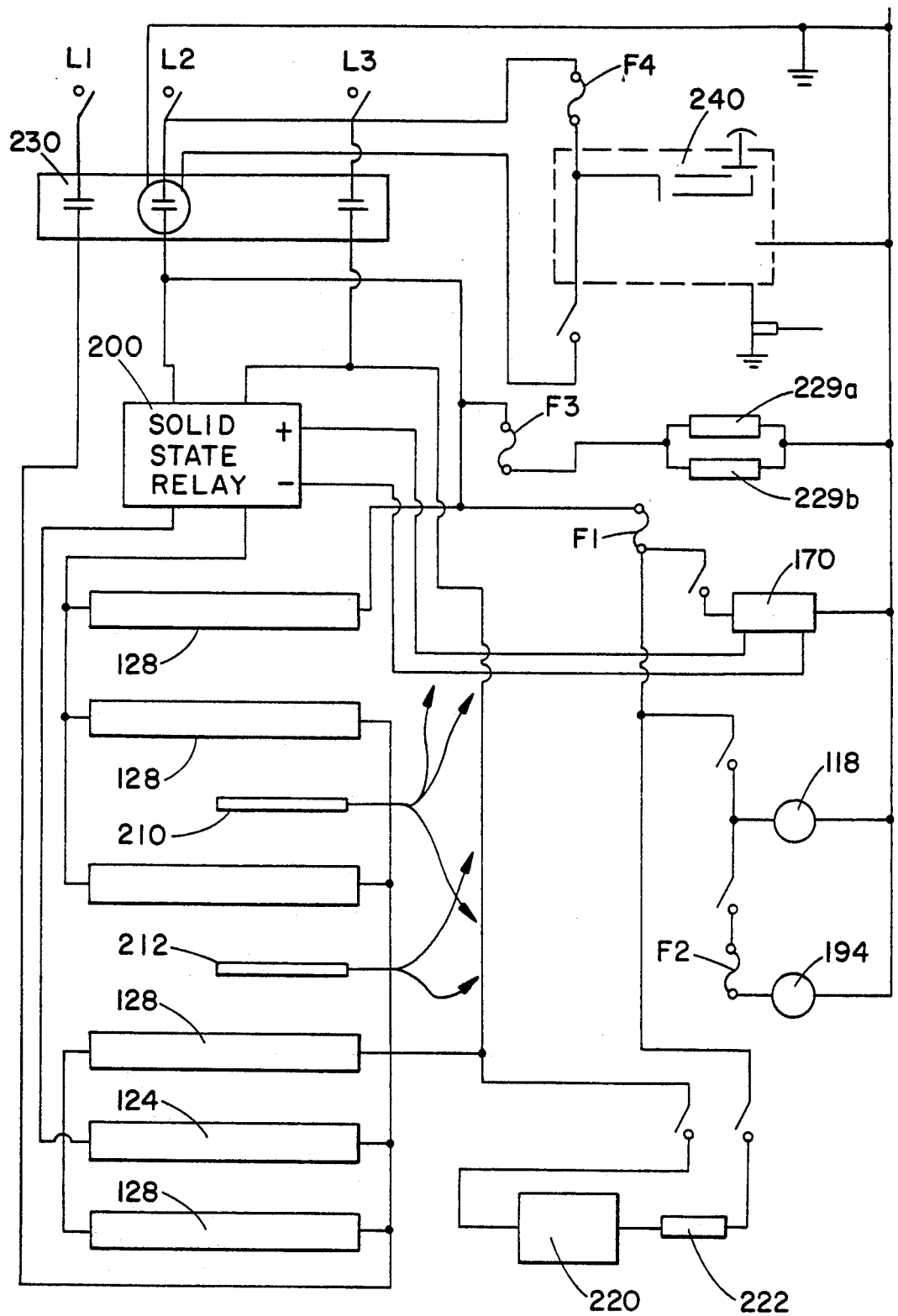
FIG. 3 is an electrical schematic of the electrical components of the pretzel oven of the instant invention; and, FIGS. 4a and 4b are elevational views of the primary drive systems of the prior art and of the present invention respectively.

With continued reference to both FIGS. 2 and 3, a first thermocouple 210 is placed in the upper chamber of the oven and provides a response to the average temperature in the cooking zone to the microprocessor-based temperature controller 170. A second thermocouple 212 is in close proximity to the pretzels being cooked, sensing temperature changes slightly below the cooking zone. The combination of these two thermocouples in the cooking zone connected to the microprocessor-based temperature controller provides an "averaged" temperature signal to the controller for more efficient control of the heat in the oven.

The heating elements 128 and 124 of the preferred embodiment are all Cal rod elements and are located in close proximity to the cooking zone. The preferred embodiment of the instant invention uses no quartz rods for heating purposes. All heating is accomplished through the Cal rod elements 128 located above the pretzels in the cooking zone and 124 located below the pretzels in the cooking zone. Quartz lamps are used, however, for illumination purposes only.

In addition to the heating elements 128 and 124, the microprocessor-based temperature controller 170 is connected to a 250 watt caustic soda heater 220 which is heats the caustic soda solution contained in the container 162. In addition, a caustic soda thermostat 222 is provided to sense the temperature of the caustic solution in the container 162 and relays that information back to the microprocessor-based temperature controller 170. Responsive to the sensed soda temperature, the controller 170 modulates power to the caustic heater 220 in order to maintain a predetermined set point temperature of the caustic soda solution. The preferred embodiment of the present invention dips the pretzel-like bakery products rather than spraying as taught in the prior art. It has been found that dipping the bakery products is very efficient when the temperature of the caustic soda solution is maintained at an elevated temperature.

As illustrated in FIG. 2, the power source supplying the pretzel oven of the preferred embodiment is a three-phase power source connected through a main line contactor 230. The main line contactor is connected to a high limit controller 240 which is in turn connected to the top and bottom thermocouples 210 and 212. The high limit controller 242 is sensitive to thermocouple signals indicating a temperature of 800° F. or above. In the event of a fire, one or both of the thermocouples 210, 212 will generate a signal which is received by the high limit controller 240. When such signal is received, the main line contactor 230 is disconnected removing all power from the oven. This limit is resettable when the oven cools.

With continued reference to FIG. 2, the drive motor 118 and the salter motor 194 are connected to appropriate legs of the three-phase power source through individual fuses. As illustrated in the figure, failure of the various components is easily traceable by merely observing the particular fuse which may have blown. That is, each of the individual components are electrically separated and supplied through individual fuses leading to easier problem traceability. In the preferred embodiment, a first fuse F1 connects the temperature controller 170, the drive motor 118 and the caustic soda heater 220. The second fuse F2 connects the salter motor 194. A third fuse F3 connects a pair of quartz display lights 229a, 229b. Lastly, a fourth fuse F4 connects the high temperature controller 240 to the three-phase power source.

In order to enhance the ruggedness of the pretzel oven of the preferred embodiment, high temperature 12-gauge wire and nickel-plated stakeons are used throughout in the manufacture of the unit. The current load of the preferred embodiment illustrated in the figure is below 30 amps through the feature of the ability to connect to the three-phase power source according to the electrical schematic of FIG. 3. Conversion to three-phase power from the prior art of and illustrated in FIG. 1, results in a reduction of current draw to no more than 28.6 amps per leg when the oven is fully taxed.

Figure 4B:
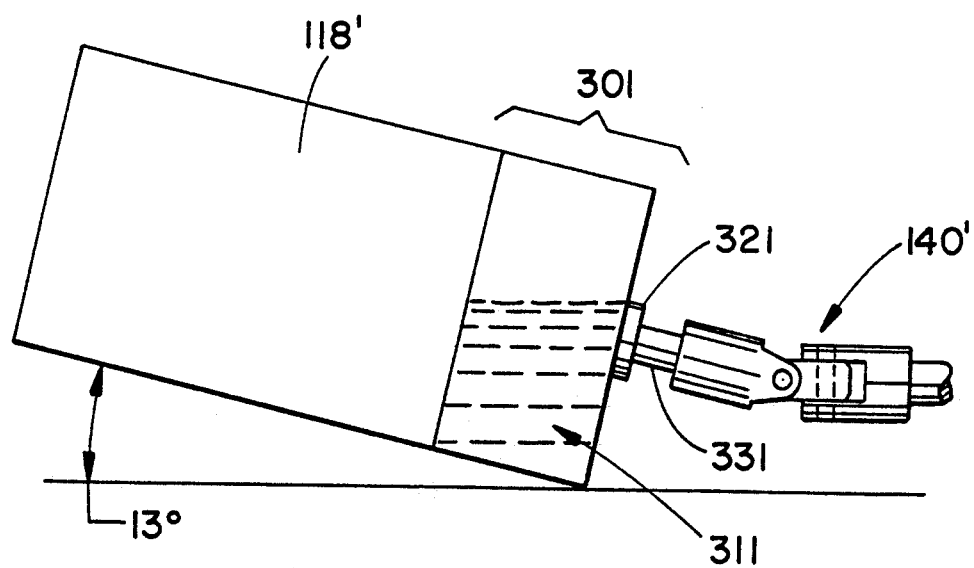

Another ruggedness enhancement is illustrated in FIG. 4b. However, with reference first to the prior art main drive motor system illustrated in FIG. 4a, the electric motor 18' was connected to a gearcase 300 partially filled with a lubricant 310 such as oil or the like. In the orientation illustrated, the lubricant 310 protects the motor bearing 320 and shaft 330 only when the gearcase 300 is sufficiently filled. However, the lubricant tends to become less viscous and less voluminous as the pretzel oven operating temperature increases. This condition is exacerbated during prolonged periods of operation.

The main drive motor system of the preferred embodiment is illustrated in FIG. 4b wherein the electric drive motor 118 is inclined or "tilted" with respect to horizontal. As illustrated, the preferred incline is thirteen degrees (13°). In this case, the lubricant 311 in the gearcase 301 completely covers and thus protects the motor bearing 321 and shaft 331 even when the gearcase is less than half full. Also, the tilted motor system of the preferred embodiment reduces the radial load on the output shaft of the motor by allowing the universal joint 140 to move efficiently about its share of axial loading. Further, the weight vane by the bearing 321 supplying the output shaft 331 is significantly reduced. Lastly, the gears (not shown) in the gearbox 301 are more thoroughly lubricated for a given volume of lubricant.

The invention has been described with reference to the preferred embodiment. Modifications and alterations may occur to others upon reading and understanding of this specification. It is my intention to include all such modifications and alternations insofar as they come within the scope of the appended claims or equivalents thereof.

Having thus described the invention, I now claim:

1. An oven for baking a pretzel-like bakery product comprising:
   a housing defining a chamber having an enclosed top, bottom, rear and open front;
   at least one endless drive belt mounted to said housing translatable in a substantially vertical plane around a closed path of travel comprising travel segments including:
   a first substantially horizontal segment disposed near the top of the chamber;
   a second substantially horizontal segment disposed near the bottom of the chamber;
   a first substantially vertical segment disposed near the front of the chamber; and,
   a second substantially vertical segment disposed near the rear of the chamber;
   at least one carrier rack means, connected to said at least one endless drive belt, for supporting said pretzel-like bakery product in a substantially horizontal orientation as said at least one endless drive belt translates in said closed path of travel;
   drive means for translating said at least one endless drive belt through said closed path of travel such that said at least one carrier rack means advances through said chamber by passing along said second substantially horizontal travel segment, said second substantially vertical travel segment, said first substantially horizontal travel segment and then along said first substantially vertical travel segment;
   bakery means, in said chamber, for baking said pretzel-like bakery product responsive to a temperature control signal; and,
   electronic control means for sensing the temperature in said chamber and generating said temperature control signal when the temperature is below a predetermined set point.

2. The oven according to claim 1 wherein said baking means includes a plurality of calrods at the top of said chamber and proximate said first substantially horizontal travel segment.

3. The oven according to claim 2 wherein said drive means includes an electric motor, connected to said at least one endless drive belt through a universal-type joint, for motivating said translation in said closed path of travel.

4. The oven according to claim 3 further comprising bath means at said bottom of the chamber for containing a caustic soda fluid, said bath means being disposed substantially in said second substantially horizontal travel segment and containing a quantity of fluid sufficient to completely cover said pretzel-like bakery product on said carrier rack means at said bottom.

5. The oven according to claim 4 further comprising rotatable salt box means, connected to said housing with ceramic self-lubricating material bearings, for selectively depositing salt on said pretzel-like bakery product at the top of said chamber substantially between said second substantially travel segment and said first substantially horizontal travel segment.

6. The oven according to claim 5 wherein said at least one endless drive belt is an endless chain carried on said housing by a plurality of sprockets each supported by non-flanged aluminum high-temperature bushings.

7. The oven according to claim 6 wherein said electronic control means includes means for heating said caustic soda fluid and maintaining the fluid at a predetermined fluid set point temperature.

8. The oven according to claim 7 further comprising salt catch means in said chamber under said rotatable salt box means for collecting salt not adhering to said pretzel-like product.

9. The oven according to claim 8 further comprising means for sensing a fire in said chamber and generating an electric high-limit signal when said fire is sensed; and,
wherein said electronic control means includes disconnect means, responsive to said electric high-limit signal, for disconnecting said oven from a power source exclusively supplying the oven with electrical power.

10. The oven according to claim 9 wherein said electronic control means includes manual input means for manually inputting said predetermined set point from an operator of the oven and display means for displaying said manually inputted set point.

11. The oven according to claim 10 wherein said electronic control means includes means for displaying said sensed temperature on said display means.

12. The oven according to claim 11 further comprising a substantially transparent thermal barrier on the housing substantially in parallel with said first substantially vertical travel segment and vertically extending from said top to a point near the midpoint of said open front.

13. The oven according to claim 12 wherein said housing is formed of double walled stainless steel panels having a plurality of layers of felted slag insulation disposed between the double walled stainless steel panels.

14. The oven according to claim 13 wherein said electronic control means includes:
first thermocouple means for sensing the temperature in said housing at the top; and,
electronic temperature controller means, connected to said first thermocouple means and to said baking means, for generating said temperature control signal responsive to said first thermocouple means.

15. The oven according to claim 14 wherein said electronic control means includes:
second thermocouple means disposed in said housing between said first thermocouple means and said top for sensing the temperature in said housing between said first thermocouple means and said top;
averaging means in said electric temperature controller means connected to said first thermocouple means and to said second thermocouple means, for deriving an average temperature in said chamber based on both signals from said first thermocouple means and said second thermocouple means; and,
means for generating said temperature control signal based on said average temperature.

16. The oven according to claim 15 wherein said power source is three-phase power and said oven includes means adapted to receive said three-phase power.

17. The oven according to claim 1 wherein said drive means includes an electric motor, connected to said at least one endless drive belt through a universal-type joint, for motivating said translation in said closed path of travel.

18. The oven according to claim 1 further comprising rotatable salt box means, connected to said housing with ceramic self-lubricating material bearings, for selectively depositing salt on said pretzel-like bakery product at the top of said chamber substantially between said second substantially vertical travel segment and said first substantially horizontal travel segment.

19. The oven according to claim 18 further comprising salt catch means, in said chamber under said rotatable salt box means, for collecting salt not adhering to said pretzel-like product.

20. The oven according to claim 1 further comprising bath means, at said bottom of the chamber, for containing a caustic soda fluid, said bath means being disposed substantially in said second substantially horizontal travel segment and containing a quantity of fluid sufficient to completely cover said pretzel-like bakery product on said carrier rack means at said bottom.

21. The oven according to claim 20 wherein said control means includes means for heating said caustic soda fluid and maintaining the fluid at a predetermined set point temperature.

22. The oven according to claim 1 wherein said at least one endless drive belt is an endless chain carried on said housing by a plurality of sprockets each supported by non-flanged aluminum high-temperature bushings.

23. The oven according to claim 1 further comprising means for sensing a fire in said chamber and generating an electric high-limit signal when said fire is sensed; and,
wherein said electric control means includes disconnect means, responsive to said electric high-limit signal, for disconnecting said oven from a power source exclusively supplying the oven with electrical power.

24. The oven according to claim 23 wherein said power source is three-phase power and said oven includes means adapted to receive said three-phase power.

25. The oven according to claim 1 wherein said electronic control means includes manual input means for manually inputting said predetermined set point from an operator of the oven and display means for displaying said manually inputted set point.

26. The oven according to claim 25 wherein said electronic control means includes means for displaying said sensed temperature on said display means.

27. The oven according to claim 1 further comprising a substantially transparent thermal barrier on the housing substantially in parallel with said first substantially vertical travel segment and vertically extending from said top to a point near the midpoint of said open front.

28. The oven according to claim 1 wherein said housing is formed of double walled stainless steel panels having a plurality of layers of felted slag insulation disposed between the double walled stainless steel panels.

29. The oven according to claim 1 wherein said electronic control means includes:

first thermocouple means for sensing the temperature in said housing at the top; and, electronic temperature controller means, connected to said first thermocouple means and to said baking means, for generating said temperature control signal responsive to said first thermocouple means.

30. The oven according to claim 29 wherein said electronic control means includes:

said thermocouple means, disposed in said housing between said first thermocouple means and said top, for sensing the temperature in said housing between said first thermocouple means and said top;

averaging means, in said electronic temperature controller means and connected to said first thermocouple means and to said second thermocouple means, for deriving an average temperature in said chamber based on signals from both said first thermocouple means and said second thermocouple means; and, means for generating said temperature control signal based on said average temperature.

31. The oven according to claim 1 wherein said drive means includes an electric motor having a gearcase containing a lubricating fluid.

32. The oven according to claim 31 further comprising biasing means for biasing said lubricating fluid into lubricating a first portion of said gearcase more than a second portion of said gearcase.

33. The oven according to claim 32 wherein said biasing means comprises means for disposing said gearcase at an off-horizontal attitude within said housing.

34. The oven according to claim 1 further comprising:

a plurality of carrier rack means, each connected to said at least one endless drive belt, for supporting a plurality of baking products during oven operation in a substantially horizontal orientation as said at least one endless drive belt continuously translates in said closed path of travel effecting a continuous process oven operation.

* * * * *